United States Patent
Jung

(10) Patent No.: US 7,123,776 B2
(45) Date of Patent: Oct. 17, 2006

(54) METHOD OF PROCESSING DIGITAL IMAGES FOR LOW-BIT RATE APPLICATIONS

(75) Inventor: Joel Jung, Guyancourt (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 724 days.

(21) Appl. No.: 10/341,909

(22) Filed: Jan. 14, 2003

(65) Prior Publication Data
US 2003/0185451 A1  Oct. 2, 2003

(30) Foreign Application Priority Data
Mar. 29, 2002  (FR) .................................. 02 04014

(51) Int. Cl.
*G06K 9/40* (2006.01)
(52) U.S. Cl. ........................ 382/261; 382/233; 382/268
(58) Field of Classification Search ................ 382/233, 382/261, 268
See application file for complete search history.

(56) References Cited

U.S. PATENT DOCUMENTS 6,636,645 B1 * 10/2003 Yu et al. ..................... 382/268

7,003,174 B1 * 2/2006 Kryukov et al. ............ 382/266

OTHER PUBLICATIONS

ISO/IEC 14496-2:2000(E), pp. 432-436.
Derviax et al: "A Postprocessing Technique For Block Effect Elimination Using A Perceptual Distortion Measure" 1997 IEEE International Conference On Acoustics, Speech, And Signal Processing. Multidimensional Signal Processing, Neural Networks. vol. 4, 1997, pp. 3001-3004.
Derviaux et al: "Blocking Artifact Reduction Of DCT Coded Image Sequences Using A Visually Adaptive Postprocessing" Proceedings Of The International Conference On Image Processing (ICIP) vol. 2, Sep. 16, 1996, pp. 5-8.
ISO/IEC 14496-2:2000 (E).

* cited by examiner

*Primary Examiner*—Phuoc Tran

(57) ABSTRACT

The present invention relates to a method of processing digital images comprising pixel blocks, said method comprising a step of detecting blocking artifacts (41) between two adjacent blocks (Bj,bk), and a step of filtering (43) the pair of adjacent blocks. The method according to the invention further comprises a filter decision step (42) based on a comparison between luminance values of the pixels of the two adjacent blocks and a reference function representing a difference of minimum luminance values that can be seen by an observer as a function of an average luminance area of the image in order to determine whether a difference of luminance between the blocks is either or not visible to an observer.

11 Claims, 6 Drawing Sheets

METHOD OF PROCESSING DIGITAL IMAGES FOR LOW-BIT RATE APPLICATIONS

FIELD OF THE INVENTION

The present invention relates to a method of processing digital images comprising pixel blocks, said method comprising a step of detecting blocking artifacts between two adjacent blocks and a step of filtering the pair of adjacent blocks.

The invention also relates to a processing device which implements such an image processing method.

The invention notably finds its application in the field of low-rate video coding. The coding technique is based, for example, on standard H.26L or an equivalent standard thanks to which a sequence of digital images is first coded and then decoded in the form of data blocks, the present invention permitting the correction of decoded data blocks for attenuating the visual artefacts caused by the block-based coding technique. Thus the invention may be advantageously integrated with portable appliances such as mobile telephones or digital personal assistants.

BACKGROUND OF THE INVENTION

With the booming of the Internet and portable appliances it has appeared to be necessary to transmit video data over mobile networks for low-bit rate and real-time applications. Coding techniques have been implemented for this type of applications such as, for example, the MPEG-4 or H.26L standard, these techniques being based on a block-based discrete transformation. Correction techniques for correcting the effects of blocks more specifically dedicated to low rates for correcting the blocking artifacts due to these block-based coding techniques have been developed in parallel.

The post-processing technique of a decoded digital image implemented in the MPEG-4 standard is described in the document of the International Standardization Organization ISO/IEC JTC 1/SC 29/WG 11, entitled "Technologie de l'information—Codage des objets audiovisuels—Partie 2: Visuel", N 3056, pp. 454–56, published Jan. 31, 2000. It has for an object to correct the effects of blocks which are possibly present in MPEG-4 coded and decoded digital images. This post-processing technique is described in FIG. 1 and comprises the following steps:
- a degradation evaluation step DEGR (11) of a digital image Im, which receives on the input said digital image Im and delivers a measure of the degradation DM of the image,
- a classification step CLASS (12) which receives on the input a segment S(j,k) of a row or column of pixels of two adjacent blocks (Bj,bk) of said digital image Im and assigns thereto a class Ci from a set of two possible classes, a uniform class C1 and a textured class C2,
- a filter step FILT (13) which receives on the input the row or column segment of pixels S(j,k) and, as a function of the measure of degradation DM, delivers or not a filtered segment S'(j,k) with the aid of the filter F1 if the segment S(j,k) is of class C1 and with the aid of the filter F2 if the segment S(j,k) is of the class C2.

The classification and filter steps CLASS (12) and FILT (13) are applied to segments of rows or columns of pixels of two adjacent blocks and are consequently implemented in a scanning loop (14) of the segments of rows and columns of the digital image Im. Once the scanning has been effected, a filtered digital image ImF is obtained.

A major drawback of this image processing method resides in its complexity which, although of the same order of magnitude as other competitive techniques, remains prohibitive for real-time and low-bit rate dedicated applications, for example, to mobile terminals.

SUMMARY OF THE INVENTION

It is an object of the present invention to propose a method of processing digital images which is less complex for a comparable efficiency.

For this purpose the digital image processing method according to the invention is characterized in that the filter step is applied as a function of a comparison between luminance values of the pixels of the two adjacent blocks and a reference function representing a difference of minimum luminance values that is visible to an observer as a function of an average luminance of an image area.

Thus the comparison of the luminance values of the two adjacent blocks and of the reference function has the effect of determining whether a difference of luminance between the two blocks is visible or not to an observer. If it is not visible, it is not useful to filter the pair of adjacent blocks. The present invention thus permits to reduce the complexity of the digital image processing method compared to the prior art method, only the blocking artifacts which are a priori visible being filtered whence a reduction of the number of the number of filter operations to be carried out. The invention retains however a comparable efficiency to that of the state-of-the-art method, the reference function used being particularly precise.

The present invention also relates to a decoding method comprising such a digital image processing method and the video decoder implementing this method.

The present invention also relates to a coding method comprising such a digital image processing method and the video coder implementing the method.

The present invention finally relates to a computer program implementing the digital image processing method according to the invention and to a signal intended to transport same.

The reduction of the complexity of the processing method according to the invention provides makes it possible to be implemented in portable appliances which have low calculation resources, of the type of mobile telephones or digital personal assistants. For such applications the processing methods proposed in the prior art would consume up to about 50% of the calculation resources when a digital image sequence is displayed. With the method of processing digital images according to the invention, this proportion is reduced considerably, further permitting to have portable appliances that have less power consumption.

BRIEF DESCRIPTION OF THE DRAWINGS

These and other aspects of the invention are apparent from and will be elucidated, by way of non-limitative example, with reference to the embodiments described hereinafter.

In the drawings.

DESCRIPTION OF PREFERRED EMBODIMENTS

The present invention relates to a method of processing a sequence of digital images coded and decoded according to a block-based coding technique, for low-bit rate and real-time applications. The coding technique used is in our example the H.26L standard, but may also be the MPEG-4 standard or any other equivalent standard. It is to be observed that this method could also be applied to a fixed image coded, for example, according to the JPEG standard.

Such a block coding technique breaks down a digital image into blocks. In the case of the H.26L standard, said blocks are 4 rows of 4 pixels. During the coding said blocks are then subjected to a frequency transformation. In the case of the H.26L standard and of most of the standard techniques, this is the Discrete Cosine Transform (DCT). During the decoding, effects of blocks may appear along the borders of the blocks. A block effect resembles an edge but it does not really exist in the contents of the image proper. It is notably an object of the invention to eliminate these "false" edges situated on the borders of the blocks in as efficient but much less complex a manner as the conventional methods.

Figure 1:
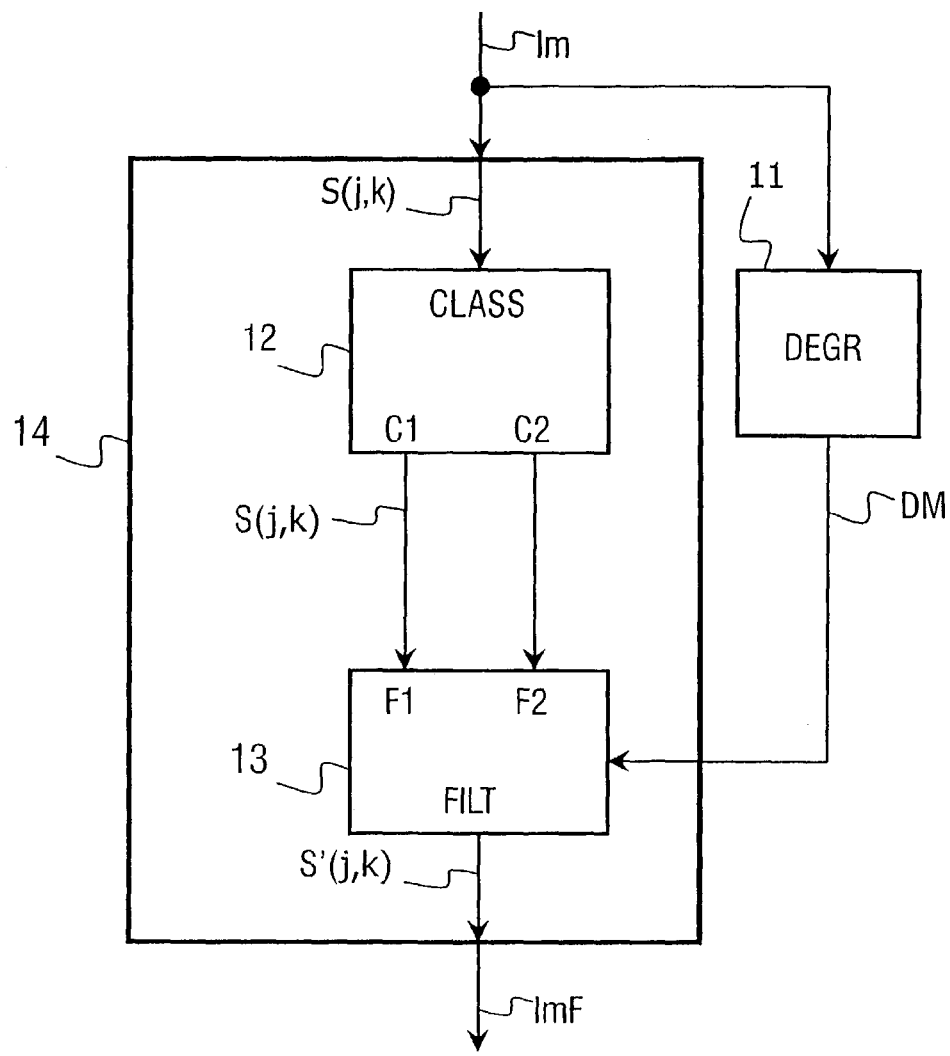
FIG. 1 is a block diagram of the digital image post-processing method according to the prior art.
Figure 2:
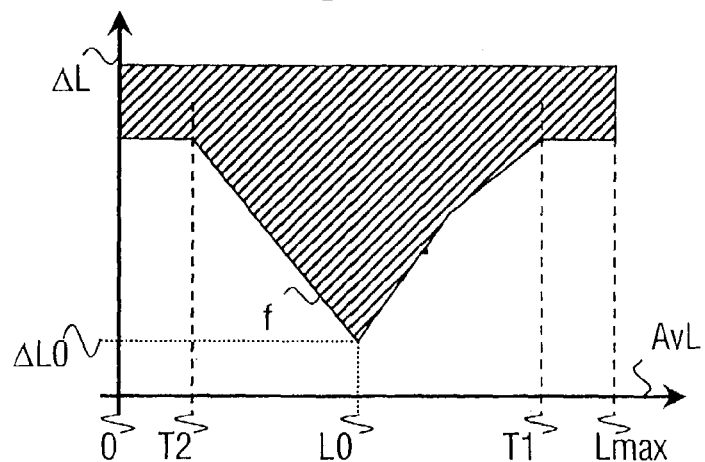
FIG. 2 is a function representing the minimum difference of luminance values that is visible to an observer as a function of the mean luminance of an image area.

The present invention is based on a reference function made into a diagram shown in FIG. 2. This function f is described more precisely in the article by H. R. Wu and M. Yuen entitled "A generalized block-edge impairments metric for video coding" and published in IEEE Signal Processing Letters, vol. 4, no. 11, pp. 317–320, November 1997. It represents the difference of minimum luminance values $\Delta L$ that are visible to an observer as a function of the average luminance AvgL of an image area, substantially equal to the surface covered by a pair of adjacent blocks. This function passes through a minimum $\Delta L0$, equal to about 1 or 2 units, for an average luminance value L0 equal to about 70 if the luminance is coded between 0 and Lmax=255. If the average luminance value of an image area is lower than the first predetermined threshold T1, the difference of luminance values visible in this area corresponds probably to a natural contour. Similarly, if the average luminance is higher than the second predetermined threshold T2, the difference of visible luminance values also probably corresponds to a natural contour.

Figure 3:
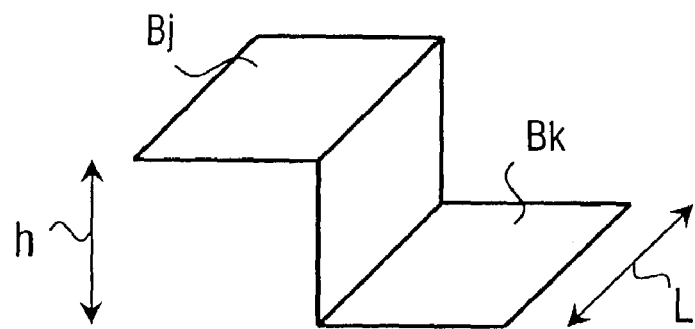
FIG. 3 represents a border between two adjacent blocks.

The hatched area in FIG. 2 represents the luminance differences that are visible to an observer. Let a pair of adjacent blocks Bj and Bk of pixels have a predetermined average luminance value avgBjBk and a difference of luminance values h as represented in FIG. 3. If the co-ordinates avgBjBk and h position the pair of adjacent blocks in the hatched area, then the blocking artifact corresponding to the difference of luminance values h is visible. In the opposite case, it is not visible. It is to be noted that the difference of luminance is either the exact value between the two blocks if each of the two blocks is uniform, or also if adjacent segments and not adjacent blocks are worked on. This may also be the average difference of luminance between the two blocks or also the minimum or maximum difference if one wishes to save on calculation resources.

Figure 4:
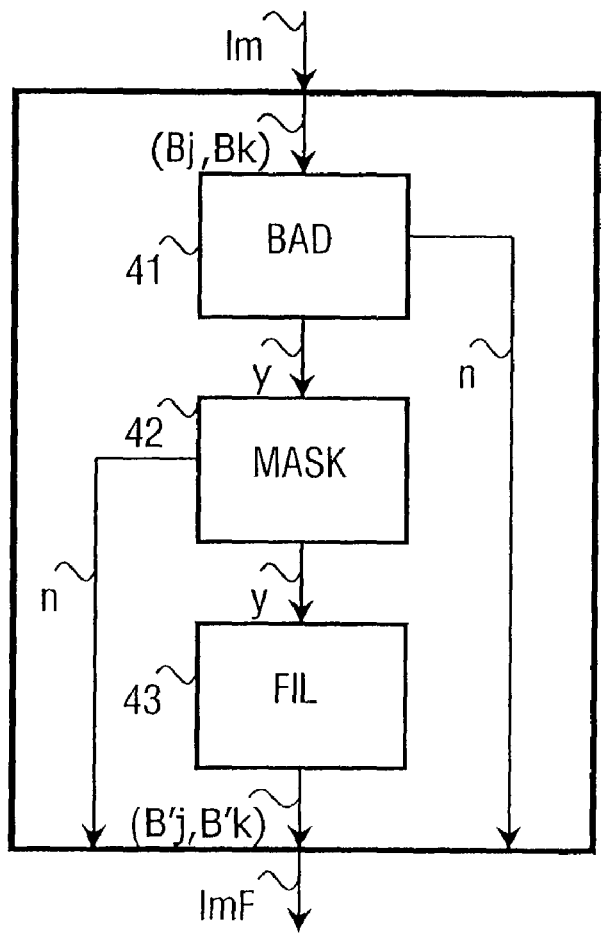
FIG. 4 is a block diagram of the digital image processing method according to the invention.

FIG. 4 describes the digital image processing method according to the invention. Said method comprises:

a step of detecting blocking artifacts PAD (41) between two adjacent blocks (Bj,bk) of an image Im, which step applies the pair of blocks either to a filter decision step if a blocking artifact is detected between the two blocks (y), or directly to the end of the method in the opposite case (n), a filter decision step MASK (42) based on the principle that has just been described, which step applies the pair of blocks either to a filter step if the blocking artifact detected between the two blocks is visible (y), or directly to the end of the method in the opposite case (n), a filter step FILT (43) of the pair of adjacent blocks, which applies a pair of filtered adjacent blocks (B'j,B'k), all the blocks processed by the method giving the final image ImF.

The present invention utilizes FIG. 2 because the filter step is applied as a function of a comparison of the luminance values of the two adjacent blocks with the reference function f, this whatever the methods used for the detection of blocking artifacts and for the filtering.

In the preferred embodiment the filter step is not applied to a pair of adjacent blocks if the minimums MinP and MinQ of the luminance values of the pixels of each block are higher than a first predetermined threshold T1 and if the maximums MaxP and MaxQ of the luminance values of the pixels of each block are lower than a second predetermined threshold T2, the second threshold being lower than the first threshold. In other words, there is no filtering if:

MinP>T1 and MinQ>T1, i.e. the pixels all belong to a bright area of the image or if MaxP<T2 and MaxQ<T2 i.e. the pixels all belong to a dark area of the image.

Thus, no average value is calculated, the method makes only use of comparisons, on the one hand, between the luminance values of the pixels before minimums or maximums are determined, and, on the other hand, between the minimums and maximums of the luminance values and two predetermined thresholds. The method thus only needs to have limited calculation resources, which reduces its complexity all the more.

In an advantageous manner the first and second thresholds T1 and T2 are predetermined as a function of a value of the quantization step QP in the following fashion:

if $QP \in [1-4]$, $T1=210$ and $T2=45$, if $QP \in [5-26]$, $T1=215$ and $T2=40$, if $QP \in [27-31]$, $T1=220$ and $T2=35$, In an advantageous manner, the filter step is not applied if a difference of luminance values h between the two adjacent blocks is smaller than a reference value equal to a value of the reference function f calculated for the average luminance value avgBjBk of the pair of blocks, in other words if: h<f(avgBjBk).

Thus, a larger number of pairs of blocks may not be filtered, the condition being more general and cumulative with the two preceding conditions. The method, however, is more complex, because it makes it necessary to calculate an average value avgBjBk.

In an advantageous manner the filter step is not applied if a length L of a blocking artifact is smaller than a predetermined value which is a function of the difference of luminance values h between the two adjacent blocks.

Indeed, a luminance difference h of 1 or 2 may not be visible if it occurs in 1 or 2 consecutive pixels, but may become visible over a length L of 16 consecutive pixels for a given average luminance. The preceding condition then becomes:

if h<f(avgBjBk)/g(L) a filtering will not be performed, where g is a weight function depending on the variable L.

Figure 5:
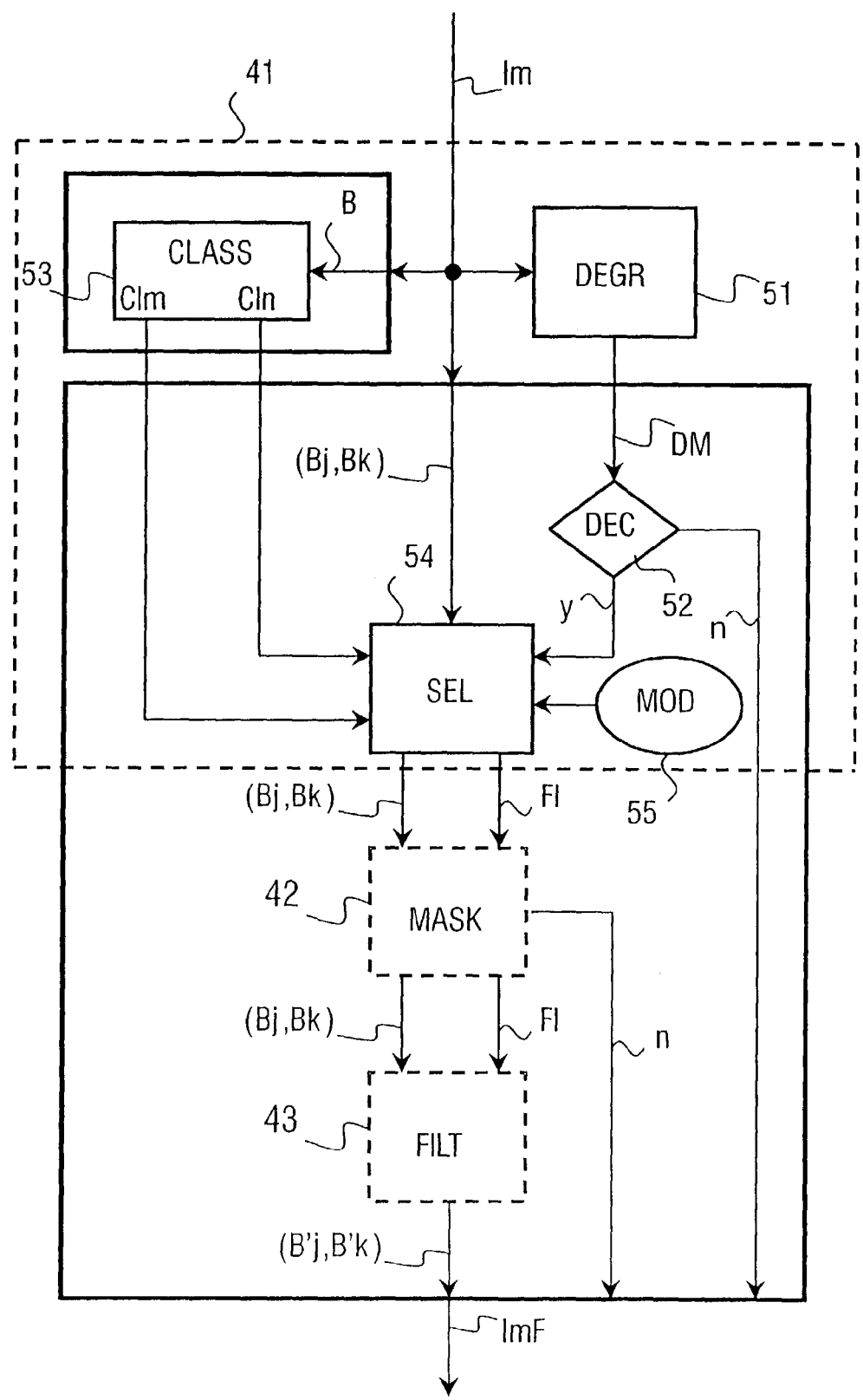
FIG. 5 is a block diagram of the digital image processing method according to the preferred embodiment of the invention.

In the preferred embodiment of the invention, the blocking artifact detection step (41) is shown in FIG. 5. It is described in more detail in French patent application 02 00487 not yet published. The step of detecting blocking artifacts comprises the following sub-steps:

A decoded digital image Im is first presented on the input of a degradation evaluation sub-step DEGR (51) which delivers a degradation measure DM of the digital image Im. The degradation measure DM corresponds, for examples, to the value of an image quantifying step or also to a substantially modified value of said quantifying step as a function of characteristics known from the coding technique used.

A filter decision sub-step DEC (52) based on the degradation measure DM then follows. Said sub-step decides for a pair of adjacent blocks (Bj,bk) of the image Im and for the degradation measure DM whether a filter sub-step is necessary or not. The decision to filter is made, for example, according to the following criterions:

If the maximum difference of luminance between the blocks Bj and Bk is lower than 1.5 times the degradation measure DM, then the decision to filter is positive (y). In this case it is thus considered that this is not a real edge, If not, it is negative (n). This time the maximum difference of luminance between the blocks is considered to be large enough for a real edge to be present which corresponds to a natural contour that need not be filtered.

In parallel with the sub-steps of degradation evaluation DEGR (51) and filter decision DEC (52), the image Im is presented block by block to a classification sub-step CLASS (53). The classification sub-step CLASS (53) associates with a block B, a class Cli chosen from a set of predefined classes, 4 classes C11 to C14 in our example.

Figure 6:
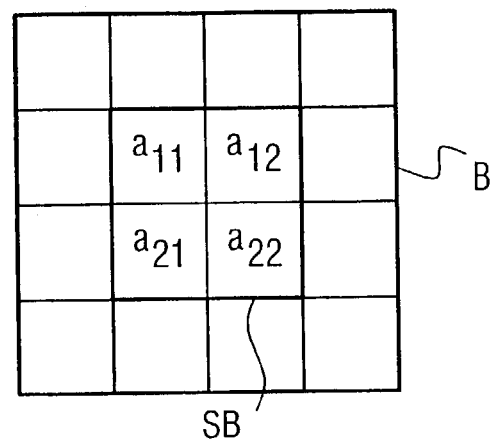
FIG. 6 describes a sub-block considered in a block for choosing a class within the classification step.

The block B belongs to a homogeneous class C11 if the following conditions are satisfied:

$|m_1-m_2|<S$, with:

$m_1 = \max\{a_{pq}\}_{p=1\ldots P-2, q=1\ldots Q-2}$ and
$m_2 = \min\{a_{pq}\}_{p=1\ldots P-2, q=1\ldots Q-2}$.

i.e. m1 is the maximum of the coefficients $a_{pq}$ of a sub-block SB so FIG. 6 defines, which does not contain the outside segments of block B, the block B comprising P rows and Q pixels and m2 is the minimum of the coefficients $a_{pq}$ of the sub-block SB, where S is a threshold equal to, for example, 3 in our case.

The block B belongs to the class of rows C12 if for any row p, for p=1 to P-2, of the sub-block SB:

$|m1-m2|<S$, with:

$m1=\max\{a_{pq}\}_{q=1\ldots Q-2}$ and $m2=\min\{a_{pq}\}_{q=1\ldots Q-2}$.

i.e. m1 is the maximum of the coefficients $a_{pq}$ of the row p of the sub-block SB and m2 is the minimum of the coefficients $a_{pq}$ of the row p of the sub-block SB.

The block B belongs to the class of columns C13 if, for any column q, for q=1 to Q-2, of the sub-block SB:

$|m1-m2|<S$, with:

$m1=\max\{a_{pq}\}_{p=1\ldots p-2}$ and $m2=\min\{a_{pq}\}_{p=1\ldots p-2}$.

i.e. m1 is the maximum of the coefficients $a_{pq}$ of the column q of the sub-block SB and m2 is the minimum of the coefficients $a_{pq}$ of the column q of the sub-block SB.

If none of the preceding conditions is satisfied, the block B belongs to the textured class C14.

Figure 7:
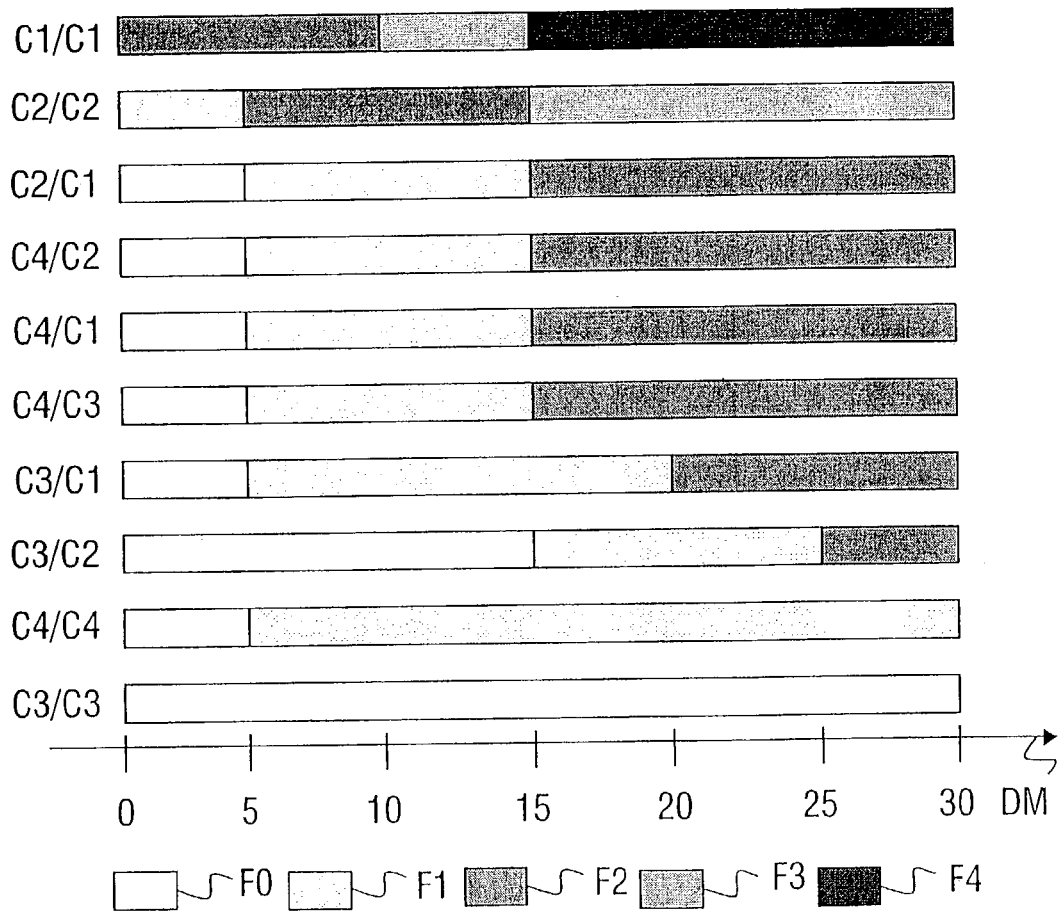
FIG. 7 represents combinations of pairs of classes and of a filter as a function of a degradation measure.

From this stage onwards, isolated blocks are no longer considered but pairs of horizontally and vertically adjacent blocks. A pair of adjacent blocks (Bj,bk) associated with a pair of classes (Clm, Cln) is then processed by a filter selection sub-step SEL (54). This filter selection sub-step SEL (54) delivers a filter F1 to be applied to the pair of adjacent blocks (Bj,bk). The choice of the filter F1 is made as a function of the pair of classes (Clm, Cln) and the degradation measure DM of the digital input image Im, from predefined models MOD (55) which associate pairs of classes with filters as illustrated in FIG. 7, where F0 corresponds to the non-filtering of the pair of blocks.

If a different filter from the filter F0 has been chosen, the filter decision step (42) such as described earlier, decides whether the blocking artifact detected between the two adjacent blocks (Bj,bk) is visible or not.

Figure 8:
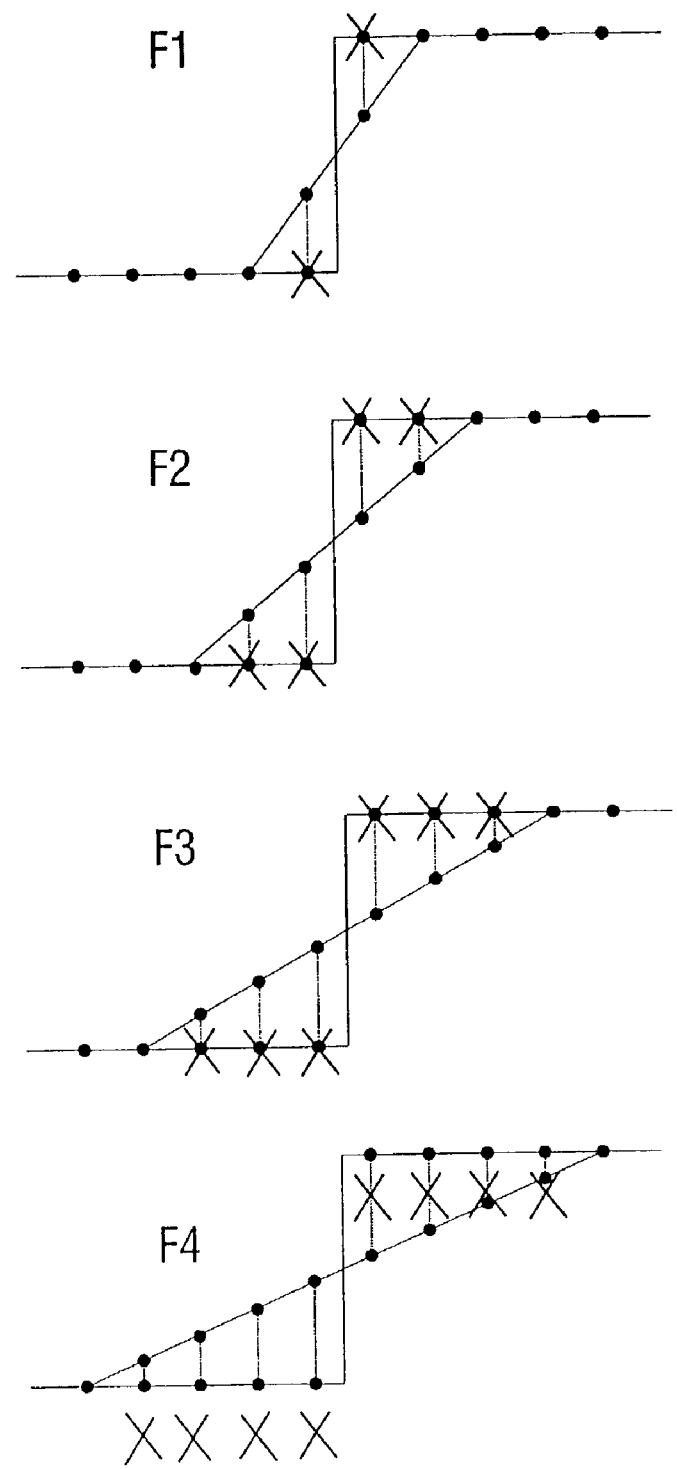
FIG. 8 represents four smoothing filters which may be used in an advantageous manner by the digital image processing method according to the invention.

If the blocking artifact is visible, the pair of adjacent blocks (Bj,bk) and its associated filter F1 are then presented on the input of a filter step FILT (43), which delivers a pair of filtered adjacent blocks (B'j,B'k). In our example 4 filters F1 to F 4 are used. They are low-pass, linear filters which are applied either in the vertical or horizontal direction. They are represented in FIG. 8.

The method according to the invention thus delivers after processing blocks and pairs of blocks of the decoded digital image Im a filtered decoded digital image ImF.

As has been observed earlier, the filter decision step is independent of the step of detecting blocking artifacts from the moment where the latter transmits thereto a pair of adjacent blocks between which a blocking artifact has been detected. The blocking artifact detection step may be, for example, the one described in international patent application WO 01/20912 (internal reference: PHF99579). Such a detection step comprises the following sub-steps:

First a sub-step of detecting pixels that belong to natural contours in a decoded image. For this purpose the detection sub-step is based on a gradient filtering which preferably uses the filter h1=[-1 1]. This filter is applied horizontally and vertically to luminance pixels y(i,j) of a digital image or of a digital image portion of the sequence, where i and j correspond to the position of the pixel in the image. Thus a horizontally filtered pixel table xh(i,j) and vertically filtered pixel table xv(i,j) are obtained of which the absolute value is taken to obtain xah(i,j) and xav(i,j). Then, a threshold is applied to each of the two tables of filtered pixels xah(i,j) and xav(i,j). All the pixels p(i,j) of which the filtered luminance value xah[i,j] or xav[i,j] is higher than a predetermined threshold value are detected as being natural contour pixels and not as blocking artifacts. The horizontal threshold value and vertical threshold value are, for example, equal to 35 and 50 respectively, for luminance values ranging from 0 to 255.

A vertical blocking artifact is thus detected if it has not been detected as being a natural contour and if:

$$\begin{cases} xah[n, j] > xah[n, j-1] + \frac{\overline{xah}}{2} \\ xah[n, j] > xah[n, j+1] + \frac{\overline{xah}}{2} \end{cases} \forall n \in [i, i+3]$$

Similarly, a horizontal blocking artifact is detected if it has not been detected as being a natural contour and if:

$$\begin{cases} xav[i, m] > xav[i-1, m] + \frac{\overline{xav}}{2} \\ xav[i, m] > xav[i+1, m] + \frac{\overline{xav}}{2} \end{cases} \forall m \in [j, j+3]$$

where $\overline{xa_h}$ and $\overline{xa_v}$ are the mean values of xah[i,j] and xav[i,j] respectively, of the image or image portion.

The filter decision step (42), as described previously, decides whether the blocking artifact detected between the two adjacent blocks is visible or not.

If it is visible, then the filter step (43) will filter the pair of adjacent blocks by utilizing, for example, a linear filtering from those described earlier.

Figure 9:
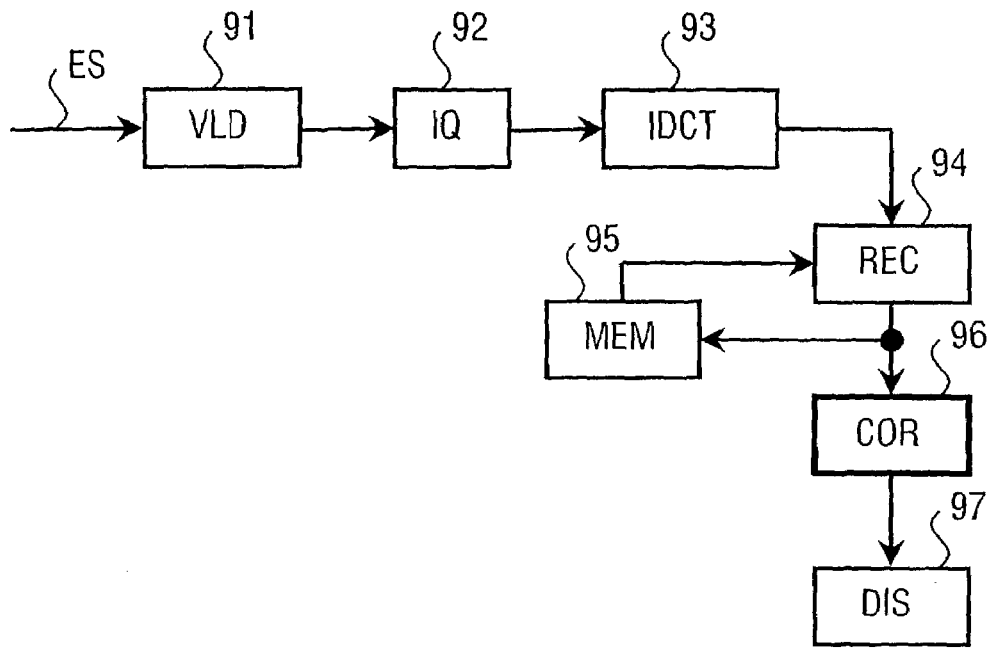
FIG. 9 is a block diagram of the decoding method including the digital image processing method according to the invention.

FIG. 9 illustrates the functioning of a video decoder suitable for producing digitally decoded data and comprising a processing device that utilizes the processing method according to the invention.

The video decoder comprises:
variable length decoding means VLD (91) of digitally coded data ES, suitable for producing quantized data,
inverse quantization means IQ (92) of the quantized data, suitable for producing transformed data, an inverse frequency transformation device, in our example an inverse discrete cosine transformation IDCT (93) of transformed data into inversely transformed data as described earlier.

The decompression device further includes a reconstruction step REC (94) of the image data-block-by-data-block thanks to an image memory MEM (95). With the processing device COR (96) implementing the processing method according to the invention, said device is suitable for processing the blocks of the reconstructed digital image so as to produce digital images processed for being displayed on a screen DIS (97).

Figure 10:
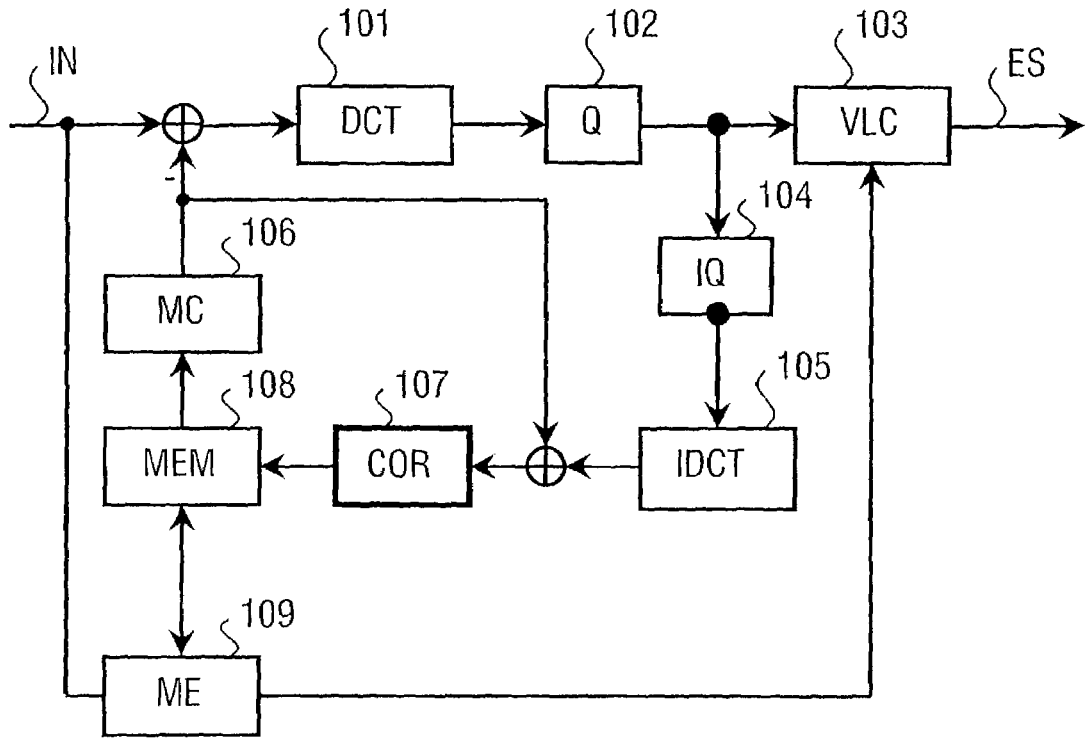
FIG. 10 is a block diagram of the coding method including the digital image processing method according to the invention.

FIG. 10 illustrates the operation of a video coder suitable for receiving digital images IN in the form of data blocks and comprising in the coding loop inverse frequency transformation means followed by a processing device which utilizes the processing method according to the invention.

The video coder (100) comprises:
a direct frequency transformation device here a direct discrete cosine transformation DCT (101) of digital video data and transformed data as described earlier,
quantization means Q (102) for quantizing transformed data, suitable for producing quantized data, and
variable length coding means VLC (103) for coding quantized data, suitable for producing coded data ES.

It also comprises a prediction unit including in a series combination:
inverse quantization means IQ (104) for inversely quantizing the quantized data, suitable for producing transformed data,
an inverse discrete cosine transforming device IDCT (105) for transforming transformed data into inversely transformed data as described earlier,
an adder of data coming from the transformation device IDCT and from a motion compensation device MC (106),
the processing device COR (107) implementing the processing method according to the invention and suitable for processing blocks of decoded data coming from the output of the adder so as to supply processed data blocks to an image memory MEM (108),
the image memory MEM (108) suitable for storing the images used by the motion compensation device MC (106), and the motion vectors coming from a motion estimation device ME (109), and
a subtracter suitable for subtracting the data coming from the motion compensation device from the digital video data of the input IN, the result of this subtracter being delivered to the transformation device DCT.

It is also possible to insert the processing device COR (107) between the inverse discrete cosine transforming device IDCT (105) and the adder, the processing being effected on a differential signal and not on a reconstructed signal.

The processing device which implements the processing method according to the invention may also improve the performance of a video coder, notably in terms of coding quality, but also in terms of output rate. Furthermore, when the video coder of FIG. 10 and the video decoder of FIG. 9 are connected in cascade, this permits to obtain an excellent image quality much better than that obtained with a standard video coder in a cascade arrangement with the video decoder of FIG. 9 or with that of the video coder of FIG. 10 in a cascade arrangement with a standard video decoder.

It is possible to implement the processing method according to the invention by means of a video decoder circuit or a video coder circuit, said circuit being suitably programmed. A computer program contained in a program memory may provoke the circuit to carry out the various operations described earlier with reference to FIG. 4 or 5. The computer program may also be loaded in the program memory by reading a data medium such as, for example, a disc which contains said program. The reading may also be effected via a communication network such as, for example, the Internet. In this case a service provider will put the computer program at the disposal of interested parties in the form of a signal that can be downloaded.

No reference sign in parentheses in the present text is to be interpreted as being limiting. The verb "to comprise" and its conjugations are also to be interpreted broadly, that is to say, as not excluding the presence of other elements or steps than those listed after said verb, but also the presence of a plurality of elements or steps already listed after said verb and preceded by the word "one" or "a" or "an".

The invention claimed is:

1. A method of processing digital images comprising pixel blocks, said method comprising:
   a detection step (41) of detecting blocking artifacts between two adjacent blocks (Bj,bk),
   a filter step (43) of filtering the pair of adjacent blocks, characterized in that the filter step is applied as a function of a comparison between luminance values of the pixels of the two adjacent blocks and a reference function representing a difference of minimum luminance values visible to an observer as a function of an average luminance of an image area.

2. A processing method as claimed in claim 1, in which the filter step is not applied to a pair of adjacent blocks (Bj,bk) if the minimums (MinP, MinQ) of the luminance values of the pixels of each block exceed a first predetermined threshold (T1) or if the maximums (MaxP, MxQ) of the luminance values of the pixels of each block are lower than a second predetermined threshold (T2), the second threshold being lower than the first threshold.

3. A processing method as claimed in claim 2, in which the first and second thresholds are predetermined as a function of a value of a quantization step corresponding to adjacent blocks.

4. A processing method as claimed in claim 1, in which the filter step is not applied if a difference luminance values (h) between the two adjacent blocks is smaller than a reference value equal to a value of the reference function calculated for an average luminance value (avgBjBk) of the pair of blocks.

5. A processing method as claimed in claim 4, in which the filter step is not applied if a length of the blocking artifact (L) is smaller than a predetermined value which is a function of the difference of luminance values (h) between the two adjacent blocks.

6. A decoding method intended to produce decoded digital images and comprising a processing method as claimed in claim 1 for processing the decoded digital images so as to produce processed digital images.

7. A method of coding digital images in the form of data blocks, the method comprising an inverse frequency transformation step followed by the detection step and the filtering step as claimed in claim 1, suitable for processing decoded data blocks coming from the inverse frequency transformation step so as to produce processed data blocks.

8. A video decoder suitable for producing processed digital images from decoded digital images and comprising a processing device, said processing device comprising:
   a detecting means for detecting blocking artifacts between two adjacent blocks (Bj,bk);
   a filtering means for filtering the pair of adjacent blocks, wherein filtering is applied as a function of a comparison between luminance values of the pixels of the two adjacent blocks and a reference function representing a difference of minimum luminance values visible to an observer as a function of an average luminance of an image area; and,
wherein said video decoder further comprises a processing means for processing the decoded digital images so as to produce processed digital images.

9. A video coder suitable for receiving digital images in the form of data blocks and comprising inverse frequency transformation means followed by a processing device which implements the processing method as claimed in claim 1, suitable for processing decoded data blocks coming from inverse frequency transformation means so as to produce processed data blocks.

10. A portable device comprising a video decoder as claimed in claim 8, for displaying the processed digital images on a screen of said device.

11. A computer readable storage medium having code for post-processing a digital image encoded and decoded according to a block coding technique, said computer readable storage medium comprising:
   code for detecting blocking artifacts between two adjacent blocks (Bj,bk);
   code for filtering the pair of adjacent blocks, wherein filtering is applied as a function of a comparison between luminance values of the pixels of the two adjacent blocks and a reference function representing a difference of minimum luminance values visible to an observer as a function of an average luminance of an image area.

* * * * *